Aug. 19, 1930.  A. H. HANNON  1,773,179
ELECTROPLATING TANK APPARATUS
Filed June 22, 1928
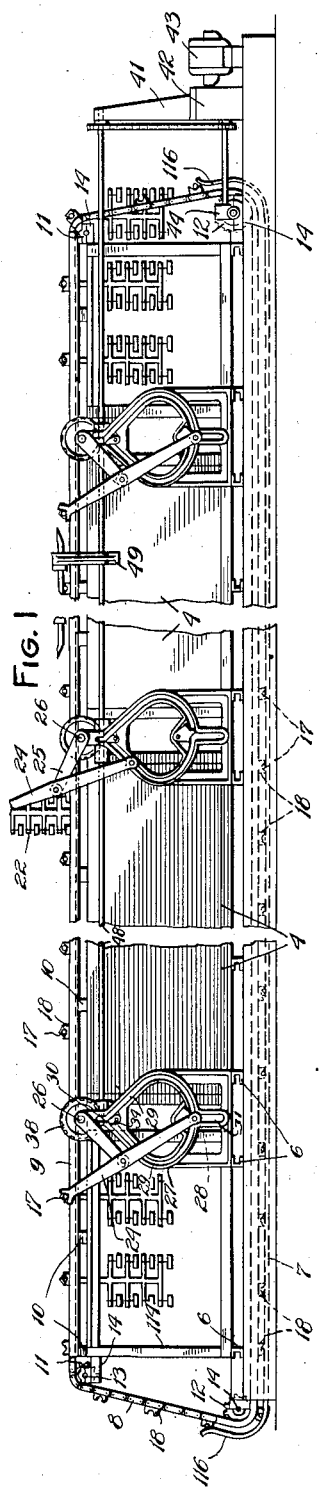
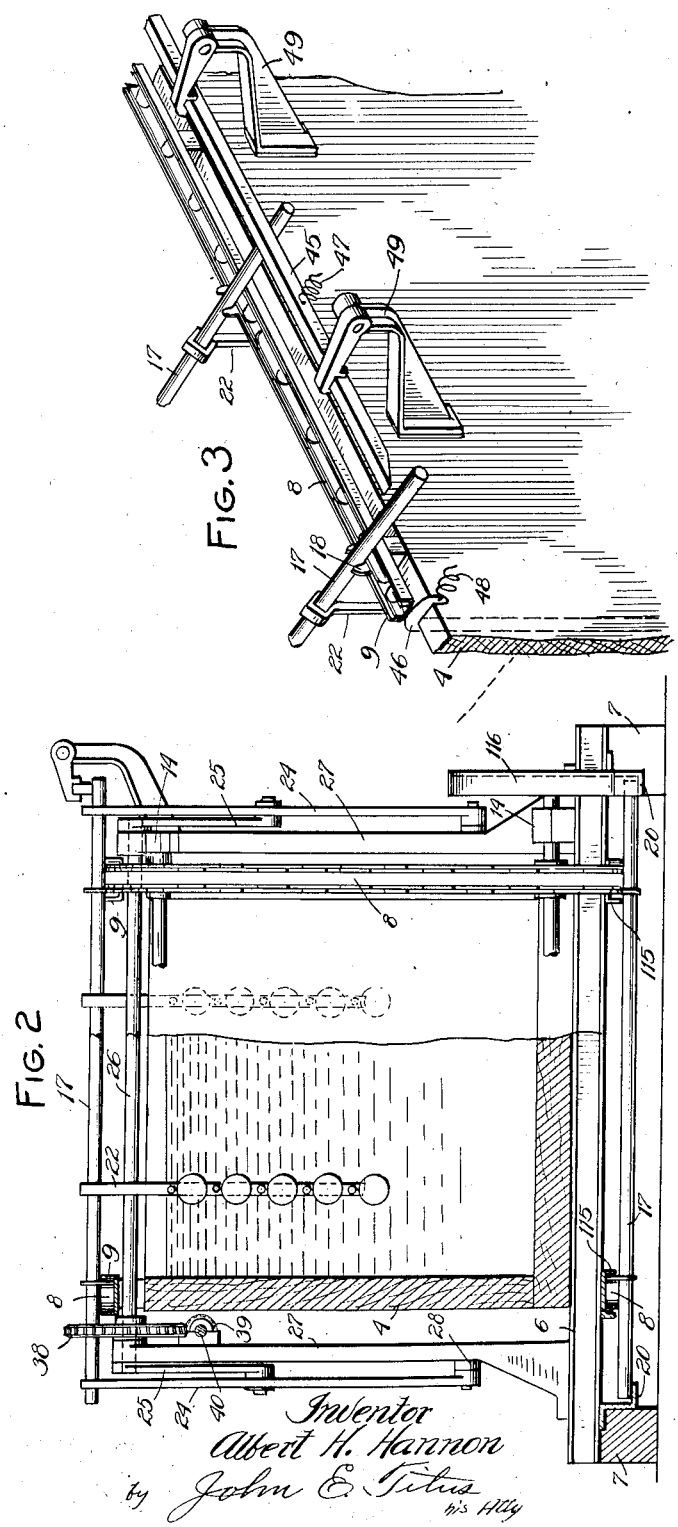

Patented Aug. 19, 1930

1,773,179

UNITED STATES PATENT OFFICE

ALBERT H. HANNON, OF CHICAGO, ILLINOIS

ELECTROPLATING TANK APPARATUS

Application filed June 22, 1928. Serial No. 287,413.

This invention relates to improvements in electro-plating apparatus and the like; and more especially to electro-plating apparatus wherein the work to be plated is hung on racks which are suspended from bars resting on moving conveyor belts to carry the work along through a series of tanks containing the different baths.

Heretofore, in electro-plating apparatus, considerable overhead structure was required to support the conveyor mechanism; and the transfer devices and the belt were entirely above the tops of the tanks. Two parallel chains were used with transversely extending rods carried by the chain on which were hooked the racks on which the work was suspended. Considerable height was required between the two flights of the chains because the work must be lifted completely out of each tank over the end and deposited in the succeeding tank.

In this invention the belt is returned under the tanks and suitable sliding supports are provided to hold the cross rods in relation with the chain so that the rods are thereby returned to the starting point. This eliminates the overhead structure and other obstructions over the tops of the tanks. The tank supports, which would be required in any case, are utilized for supporting the conveyor with the obvious result that the weight of the structure is reduced throughout.

Also very complicated mechanism was required for transferring the work from one tank to the next, the operation of which was generally unsatisfactory because it was difficult to time with the travel of the rods on the belt; and also was somewhat unsteady in its movement and was liable to shake the work of the rack since, ordinarily, a wire is attached to the work which is merely hooked over horizontal branches on the racks. In this invention a transfer mechanism, which is fully shown and described in my patent number 1,706,626, dated March 26, 1929, is provided which is supported entirely below the tops of the tanks. The carrier members rise from below and engage the rods at the ends and lift the rods, with the racks of work suspended therefrom, vertically until the work is clear. Then the work is swung over horizontally with a steady and positively controlled movement and lowered vertically into the next tank and back onto the conveyor. Particular advantages of this transfer device are that extremely accurate timing with the conveyor is not required, the timing is easily adjusted, all of the transfer devices are easily driven from the same place at which the belt is driven, the framework is below the tank tops, high lifts are easily attained, greater speeds may be employed, and the work transferred more rapidly. Also the mechanism is extremely simple and not likely to get out of order. Other objects and advantages will appear in the following description, with reference to the accompanying drawings, in which:

Fig. 1 is a side elevation of an electro-plating apparatus embodying my invention, with intermediate portions broken out.

Fig. 2 is an end view with parts shown in section.

Fig. 3 is a perspective view of the side portion of the plating tank.

In the drawings a plurality of wooden tanks 4 are placed end to end in a line, supported on a suitable framework above the floor line 5 and spaced therefrom. The tanks are supported on channel iron cross members 6 which rest on longitudinal wooden stringers 7, and are thus insulated from the floor.

The conveyor belt comprises two endless chains 8, which travel along the upper sides of the tanks, slidably supported in channel members 9 which are supported by blocks 10, mounted on the upper edges of the tanks. Beyond the ends of the line of tanks the chains pass over sprocket wheels 11 and 12 carried on the shafts 13 and 14, which are rotatably mounted in bearings 15 supported from the upper and lower edges respectively of the end frames 114; and the chains return underneath the tanks in the space between the cross members 6 and the floor, guided in the inverted channels 115 which are secured to the cross member 6 and extend the length of the machine.

For holding the work-support rods 17 notched plates 18 are provided, suitably spaced along the length of the chains. The work-support rods 17 rest in the notches in the plates 18 of the chains 8 along the tops of the tanks, being deposited on the chains at one end of the machine with the work loaded thereon, and removed from the chain at the other end of the machine. When the work is removed from the rod at the unloading end, the rod is placed in the notched plates near the end of the curved guides 116. The ends of the rods are engaged underneath the guides 116 and are thereby held in the notches around the curved end portions of the chains, and guided onto the inwardly projecting flanges of the Z bars 20. The Z bars are mounted on the stringers 7 and extend the full length of the machine for supporting the lower stretch of the chain and the rods 17 engaged therein. At the opposite end of the machine, the rods are carried around the curve of the guide rail 116.

The work is hung on the branches of the tree racks 22 which are hooked onto the rods 17 at the loading end at the left of Fig. 1, and removed at the unloading end, so that the work is suspended in the tanks as the rods 17 move along on the conveyor.

When a rod 17 approaches the end of a tank, it is engaged by the forked ends of the transfer bars 24, which lift the rod vertically upward off the chains to lift the work out of the tank, and then swing the rod horizontally and lower the work into the next tank and return the rod into place in another pair of notched plates 18 on the chain. This operation is of course repeated at the end of each tank until the rod is lifted over the end of the last tank.

The transfer bars 24 are pivotally connected, near the middle, to the crank arms 25, which are keyed to the transverse shaft 26. The shaft 26 is located near the plane of the tops of the tanks, just under the channel chain guides a, and is supported in suitable bearings in the upper ends of the frames 27, which frames are located on either side of the line of tanks. At the lower ends, the bars 24 are guided to oscillate on the crank by means of a roller 28, rotatably mounted on the bar, which rides in a cam groove formed in the frame. The cam groove is divided into two paths 29 which are symmetrically disposed on either side of a vertical plane through the axis of the shaft 26. At the upper and lower ends the paths 29 join into straight portions 30 and 31 respectively, and is so shaped that the bar 24 is guided, while carried around on the crank 25, to cause the upper or engaging end of the bar to move in a substantially rectangular path, as indicated in Fig. 3.

The roller 28 is guided into the path 29, at the left, as the bar is raised, by means of the latch member not shown, which may be pivotally mounted in the frame and pressed for counter rotation by means of a spring. At the upper end, the roller moves the upper end of the latch 34 to the right and is guided thereby into the straight cam portion 30. At this position the vertical movement of the bar is completed and the roller is guided to move only vertically while the crank is turning through the upper arc of its rotation, with the result that the bar is positively swung to the right without any slack motion or jarring.

At the end of the horizontal movement, which places the work over the succeeding tank, the roller begins to move downwardly, and is directed into the right hand path 29 by the latch 34, which has snapped back into the position shown in Fig. 3, under the pressure of a suitable spring.

The bar 24 is then guided so that the upper end moves vertically downward. At the lower portion, the roller pushes the latch 32 aside, and is thereby guided into the vertical path 31, which causes the upper end to swing back to the starting position at the left, ready to lift and transfer the next rod.

A worm gear 38 is keyed on each of the transfer shafts 26, and the worm gears each mesh with corresponding worms 39 which are all keyed to the line shaft 40 which is rotatably mounted in suitable bearings in the frames 27, at one side of the tanks.

At the right end in Fig. 1, the line shaft 40 extends into the transmission stand 41 and is geared through as suitable speed reduction transmission 42 to the motor 43. The conveyor belt is also driven from the transmission 42, through a worm and gear drive 44 on the lower sprocket shaft 14.

By this arrangement, timing between the chains and the transfer devices, is easily accomplished. Also the individual transfers are easily adjusted by shifting the worms axially on the shaft by methods which are well known in the mechanical arts.

When the work is transferred into the platink tank it is subjected to the action of the plating current which flows between the bus bars 45, and the anode rod 46, which are hooked over the edges of the tanks and suspended in the solution in the tanks, current being supplied to the bars 45 and the rods 46 by the connectors 47 and 48 respectively. The bus bars 45 may be located on either or both sides of the plating tank and are hinged in the brackets 49, which are mounted on the sides of the tank, to ride on the ends of the rods 17. The rods 17 are supported in the plates 18 of the chain 8 which is slidably supported by the channel members 9, and the bus bars 45 are hingedly supported in the brackets 49 so that they are raised slightly as the rods are carried under the bevelled ends of the bus bars and engage the under sides of the same. Then as the rods 17 are moved along with their ends under the bus bars, the bus bars rest freely on the rods and a sliding contact is ensured, By mounting the bus bars at the sides of the tanks, the contacting surfaces are not subjected to the fumes and spattering of the acid in the electrolyte which would tend to corrode the surfaces and increase the resistance to the flow of the low voltage current.

The tops of the tanks are unobstructed by the conveyor and transfer mechanism, the work is accessible at all times, and a very simple and economic form of apparatus is provided.

While I have shown only one embodiment of my invention, I wish it to be understood that it may be embodied in many different forms from the precise form shown without departing from the spirit of the invention.

I claim:

1. The combination with a row of plating tanks, loose work-support rods, conveyor chains extending across the tops of the tanks and back underneath the tanks, said chains having projecting notched plates for receiving and supporting the rods, means for lifting the rods from the chains to transfer the work from one tank to the next, and guides for holding the rods in the notches of the plates at the ends and underneath the tanks.

2. The combination, in plating machine, of a line of solution tanks, a base frame for supporting the solution tanks in spaced relation from the floor, channels mounted on the side edges of the tanks, endless conveyor belts extending along the tops of the tanks supported in the channels, down at the ends of the line and returning underneath the tanks, the belts having notched plates for supporting and moving loose work-support rods over the tops of the tanks, transfers mounted on the frame for raising the rods at the end of each tank to transfer the work suspended on the rods into and out of the tanks, and from one tank to the next tank.

3. The combination, in plating apparatus, of a base frame for supporting a solution tank, channels mounted on the side edges of the tank endless conveyor belts movably mounted in the frame and slidably supported in the channels along the sides of the tank and returning underneath the tank, recessed plates in the belts for receiving and supporting loose work carrier rods in position across the top of the tank for suspending work in the tank, and guide rails mounted underneath the tank in spaced relation below the return flight of the belts for maintaining the rods in engagement in the recesses of the plates for returning the rods to the loading end of the tank.

4. In electro-plating apparatus, a solution tank, means for conveying work-support rods along the top of the tank for suspending the work in the tank with the ends of the rods projecting over the side of the tank, and a bus bar for supplying current to the rods and work suspended thereon, the bus bar being yieldably mounted so as to ride on the tops of the rods.

5. In an electro-plating apparatus, a solution tank, means for supporting and conveying a loose work-support rod along the top of the tank for suspending work in the tank, and a bus bar for supplying current to the rod, the bar being mounted to extend along the side of the tank and to rest on the end of the rod as the rod is carried thereinunder.

6. In an electro-plating apparatus, a solution tank, means for conveying work-support rods along the top of the tank for carrying work through the solution in the tank, and a bus bar for supplying current to the rod and work, the bar being hingedly supported to rest on top of the rod and to swing upwardly away from the rod.

7. In an electro-plating apparatus, a solution tank, channel members mounted along the sides of the top of the tank, conveyor chains slidably supported in the channel members, recessed plates in the chains for carrying work support rods, and a bus bar movably mounted at the side of the tank to rest on the ends of the rods.

ALBERT H. HANNON.